United States Patent [19]
Larsson et al.

[11] Patent Number: 5,465,276
[45] Date of Patent: Nov. 7, 1995

[54] METHOD OF FORMING A CHANNEL ESTIMATE FOR A TIME-VARYING RADIO CHANNEL

[75] Inventors: Lars G. Larsson, Stockholm; Perols B. O. Gudmundson, Sollentuna, both of Sweden

[73] Assignee: Telefonaktiebolaget LM Ericsson, Stockholm, Sweden

[21] Appl. No.: 942,270

[22] Filed: Sep. 9, 1992

[30] Foreign Application Priority Data

Sep. 10, 1991 [SE] Sweden ............................... 9102612

[51] Int. Cl.$^6$ ............................... H03D 1/06; H04B 1/10
[52] U.S. Cl. ............................ 375/346; 375/348; 455/63
[58] Field of Search ............................ 375/99, 101, 14, 375/94; 371/43, 44, 45; 455/63, 65

[56] References Cited

U.S. PATENT DOCUMENTS

| | | | |
|---|---|---|---|
| 4,516,241 | 5/1985 | Farah et al. | 370/110.1 |
| 4,564,952 | 1/1986 | Karabinis et al. | 375/14 |
| 4,631,734 | 12/1986 | Foschini | 375/15 |
| 4,656,644 | 4/1987 | Ozaki | 375/14 |
| 5,164,961 | 11/1992 | Gudmundson | 375/99 |
| 5,204,878 | 4/1993 | Larsson | 375/14 |
| 5,297,169 | 3/1994 | Backström et al. | 375/101 |

FOREIGN PATENT DOCUMENTS

| | | |
|---|---|---|
| 0434651 | 11/1990 | European Pat. Off. |
| 464902 | 4/1991 | Sweden |

OTHER PUBLICATIONS

L. Lindbom, "Adaptive Equalization for Fading Mobile Radio Channels," UPTEC 92124R, Institute of Technology, Uppsala University, Chapter 4 (Nov. 1992).
G. D. Forney, Jr., "Maximum–Likelihood Sequence Estimation of Digital Sequences in the Presence of Intersymbol Interference", *IEEE Transactions on Information Theory*, vol. IT–18, pp. 363–378 (May 1972).
W. C. Y. Lee, *Mobile Communications Engineering*, Chapters 6 & 7, McGraw–Hill, Inc., pp. 169–205, 207–233 (1982).
F. R. Magee, Jr., et al., "Adaptive Maximum–Likelihood Sequence Estimation for Digital Signaling in the Presence of Intersymbol Interference", *IEEE Transactions on Information Theory*, pp. 120–124 (Jan. 1973).
A. P. Clark et al., "Channel Estimation for an HF Radio Link", *IEEE Proc.*, vol. 128, pp. 33–42 (Feb. 1981).
A. P. Clark et al., "Adaptive Channel Estimator for an HF Radio Link", *IEEE Transactions on Communications*, vol. 37, pp. 918–926 (Sep. 1989).
A. P. Clark et al., "Efficient Estimators for an HF Radio Link", *IEEE Transactions on Communications*, vol. 38, pp. 1173–1180 (Aug. 1990).

*Primary Examiner*—Stephen Chin
*Assistant Examiner*—T. Ghebretinsae
*Attorney, Agent, or Firm*—Burns, Doane, Swecker & Mathis

[57] ABSTRACT

Radio signals are transmitted over a fading radio channel and are filtered and sampled in a receiver to obtain a digital signal. A channel equalizer has an equalizing filter in which a channel estimate is formed with the aid of a known synchronizing sequence. A Viterbi analyzer decides symbols with the aid of the channel estimate. An estimated time derivative of the channel estimate is formed and adapted with the aid of the decided symbols. The channel estimate is adapted to the radio channel by the derivative estimate and the decided symbols. In the event of fading with rapidly varying signal strength, the channel estimate is adapted slowly and is predicted mainly through the derivative estimate which varies relatively evenly. The digital signal is stored in a memory and an initial value is formed for the derivative estimate as a difference between two known channel estimates divided by a time difference therebetween. The known channel estimate may belong to two separate synchronizing sequences or may belong to one synchronizing sequence and a fading time point in which the channel estimate has zero value.

15 Claims, 4 Drawing Sheets

METHOD OF FORMING A CHANNEL ESTIMATE FOR A TIME-VARYING RADIO CHANNEL

TECHNICAL FIELD

The present invention relates to a method of forming a channel estimate for a time-varying radio channel, in which radio signals are transmitted over the radio channel between a transmitter and a receiver and are subjected to disturbances such as multipath propagation, fading and noise, and wherein the radio signals are sampled to obtain received symbols which include information-carrying symbols and at least one symbol-containing synchronizing sequence, said method including the following method steps:

forming a receiver channel estimate, i.e. an appreciation of parameters in a radio-channel transmission function with the aid of at least one of said synchronizing sequences; and forming a derivative estimate, i.e. an appreciation of parameters in at least a first time derivative of the channel estimate.

BACKGROUND ART

In radio communication, echo signals can occur over a radio channel as a result of multipath propagation of a transmitted radio signal. The transmitted signal reaches a receiver both directly and also via one or more reflected or otherwise deflected signal paths. In the case of digital transmission systems, the echo signals give rise to intersymbol interference. The problems resulting from this interference are well known and solutions to the problems are described in the literature, for instance in an article in IEEE TRANSACTIONS ON INFORMATION THEORY, Vol. IT-18, No. 3, May 1972, G. D. Forney: "Maximum-Likelihood Sequence Estimation of Digital Sequences in the Presence of Intersymbol Interference". The receiver has an adjustable filter which is set with the aid of a known synchronizing sequence. The filter is an image of a sampled impulse response for the channel, usually designated a channel estimate, whose parameters are used to establish the values of transmitted symbols. If the channel is changed with time, the channel estimate is adapted, possibly with the aid of the established symbols, for instance as described in an article in IEEE TRANSACTIONS ON INFORMATION THEORY, January 1973, pages 120–124, F. R. Magee and J. G. Proakis: "Adaptive Maximum-Likelihood Sequence Estimation for Digital Signaling in the Presence of Intersymbol Interference". In the case of channels which are changed quickly in relation to the transmitted bit frequency, further problems arise because the adaptation process must be effected so quickly that it generates noise itself. The channel estimation herewith becomes sensitive to erroneous decisions. Swedish Patent Application No. 8903526-5 describes an equalizer which overcomes these problems. The equalizer is provided with an analyzer which operates in accordance with a Viterbi algorithm having a requisite number of states. Each state is assigned a channel estimate, which is adapted in accordance with selected state transitions in the Viterbi algorithm. This adaptation is effected without time delay in the analyzer. The problem of erroneous decisions during adaptation of the channel estimation is particularly apparent in the case of fading, where the signal strength rapidly decreases and fades away and thereafter rapidly increases. The fading phenomenon is caused by interfering radio signals and is described in detail by William C. Y. Lee in Mobile Communications Engineering, Chapters 6 and 7, McGraw-Hill, Inc., 1982. In order to overcome the estimation problems caused by fading, there is required a better model of the channel than that obtained with the aforesaid methods. One proposal for such improved channel estimation is given in IEEE TRANSACTIONS ON COMMUNICATIONS, Vol. 37, No. 9, September 1989, A. P. Clark and S. Hariharan: "Adaptive Channel Estimation for an HF Radio Link". This article suggests generally the use of the channel estimate derivative in channel estimation processes. The article, however, gives no indication as to how the derivative shall be initiated, for instance, during the estimation process so that a reliable derivative will be obtained. When a plurality of symbols are lost, particularly with fading it is essential that such a reliable derivative is obtained.

DISCLOSURE OF THE INVENTION

The object of the present invention is to provide a channel estimate with the aid of a reliable estimate of the time derivative of the channel estimate. Fundamental to the invention is that complex transmitted symbols have a real and an imaginary part which vary relatively regularly with slowly varying derivatives, even when fading is pronounced. A derivative estimate of the channel impulse response is used to adapt and predict a channel estimate, particularly during and after fading occasions in which a number of symbols are lost. The derivative estimate is calculated with a starting point from channel estimates for synchronizing sequences. According to one alternative, there is formed an initial value for the derivative estimate, such as a difference between two known channel estimates divided by a time distance between said channel estimates. The channel estimate is adapted to received signals and is predicted with the aid of the derivative estimate, which may also be subsequently adapted. A second derivative and derivatives of higher orders may also be used in the channel estimation.

BRIEF DESCRIPTION OF THE DRAWINGS

The invention will now be described in more detail with reference to the accompanying drawings, in which.

BEST MODE OF CARRYING OUT THE INVENTION

Figure 1:
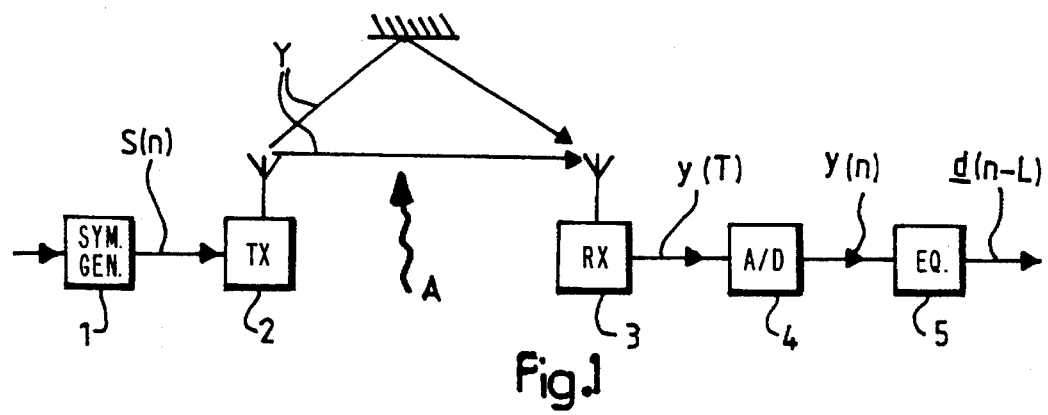
FIG. 1 is a block schematic of a radio transmission system.
Figure 2:
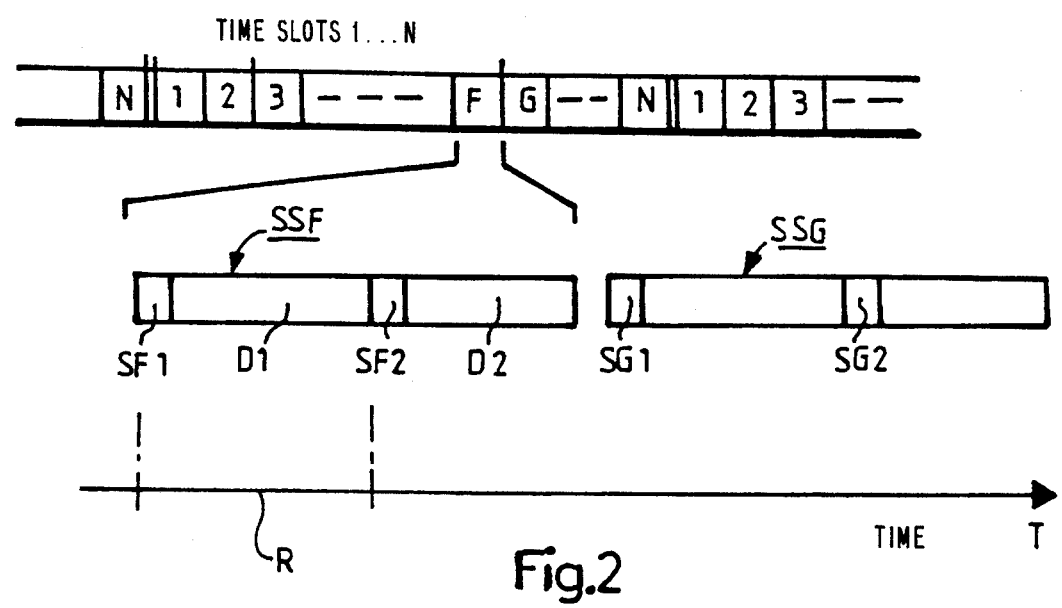
FIG. 2 illustrates time slots and signal sequences for a time-shared radio transmission system.
Figure 3:
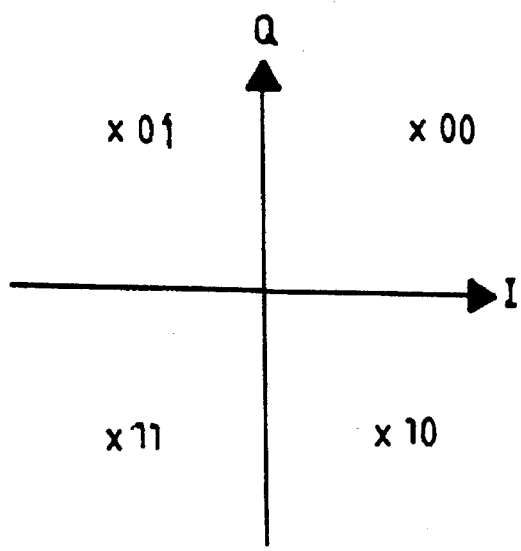
FIG. 3 is a diagram illustrating a complex numeric plan with complex symbols.

A known radio transmission system for time-shared radio communication is shown schematically in FIG. 1. A transmitter has a unit 1 which generates digital complex-value symbols S(n). These symbols are converted digital/analogues and are transmitted as a signal Y from a unit 2 to a receiving unit 3 of a receiver. The receiver modulates the signal down to an analog received signal y(T) in the baseband. The signal is sampled in an analog-digital converter 4 to a received digital signal y(n) and is delivered to a channel equalizer 5. This equalizer produces, with a given time delay, estimated symbols $\underline{d}(n-L)$ which perform an appreciation of the transmitted complex value symbols S(n). The designation (n) denotes a sampling time point having the number n and the designation (n-L) denotes that the estimated symbols are delayed by a number L sampling intervals. The double signal-paths shown in the Figure indicate that the channel between the units 2 and 3 subject the transmitted signal Y to time dispersion. The signal A represents a disturbing signal on the same frequency as that used between the units 2 and 3, a so-called co-channel disturber. Noise and signal-fading also disturb transmission, as explained in further detail herebelow. The radio transmission system is time-shared with individual time slots 1-N according to FIG. 2, in which T designates time. A signal sequence comprising at least one synchronizing sequence and one data sequence containing the information desired to be transmitted can be transmitted in each time slot. A signal sequence SSF, which according to the illustrated example has two synchronizing sequences SF1 and SF2 and two data sequences D1 and D2, is transmitted in a time slot F. Correspondingly, a signal sequence SSG in an adjacent time slot G has synchronizing sequences SG1 and SG2. It should be noted that, for instance, SF2 need not be a synchronizing sequence in the actual meaning of the term, but may be another known sequence. One example in this regard is a so-called CDVCC-sequence, which is used to decide whether or not a received signal belongs to its own connection or derives from the co-channel disturber A. The signal sequences include binary signals, although the aforesaid symbols S(n) are complex and modulated in accordance with QPSK-modulation, for instance, as illustrated in FIG. 3. In a complex numeric plan, with the axis designated I and Q, the four possible values of the symbols S(n) are marked in each quadrant with the binary numbers 00, 01, 10 and 11. The time taken to transmit a thus modulated symbol is referred to as symbol time TS. With regard to the analog signal y(T) in the baseband, this signal can be expressed as $$y(T)=I(T)+jQ(T), \text{ where } j=\sqrt{-1}.$$

Figure 4:
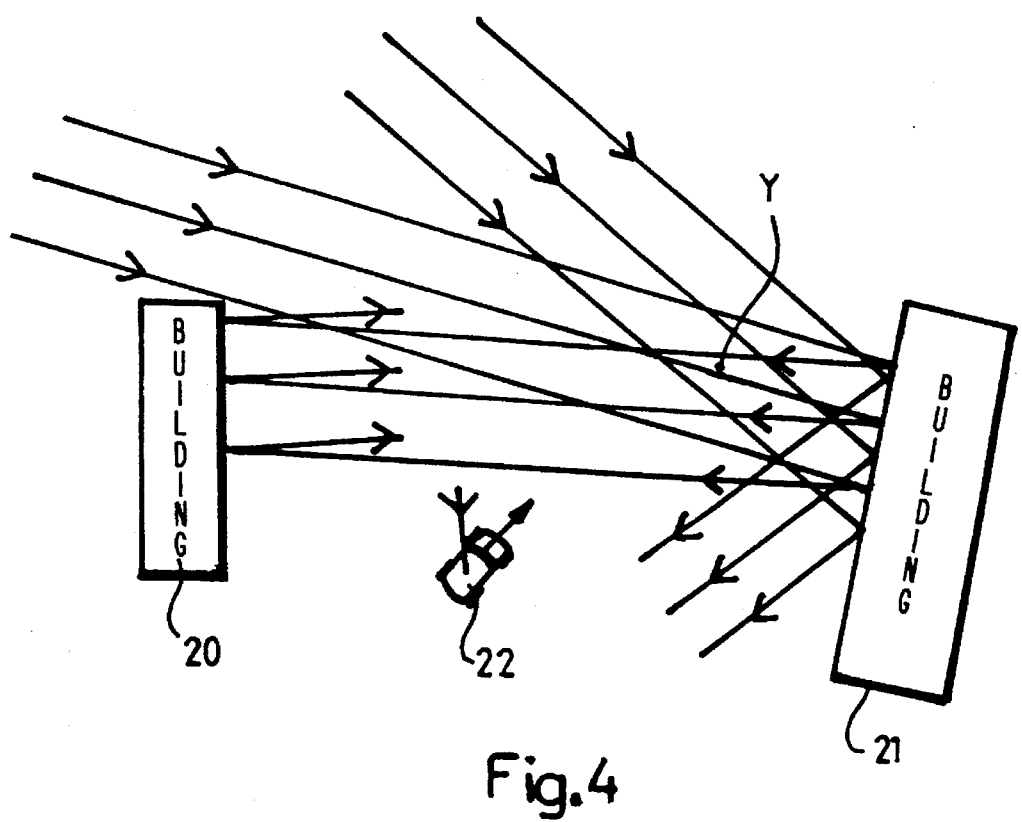
FIG. 4 is a view of buildings between which radio signals are reflected, and also shows a mobile radio receiver.

The aforementioned signal fading occurs in the following manner. Shown in FIG. 4 are two buildings 20 and 21 which reflect the transmitted signal Y. The reflected signals interfere with one another between the buildings and a complicated interference pattern is liable to occur with alternating maximum and minimum signal strengths. A mobile receiver 22 which carries the receiver 3, 4, 5 and which moves through the interference pattern will repeatedly pass the signals of minimum strength. The signal strength is there extremely low and falls beneath the noise level or the signal level from the co-channel disturber A.

Figure 5:
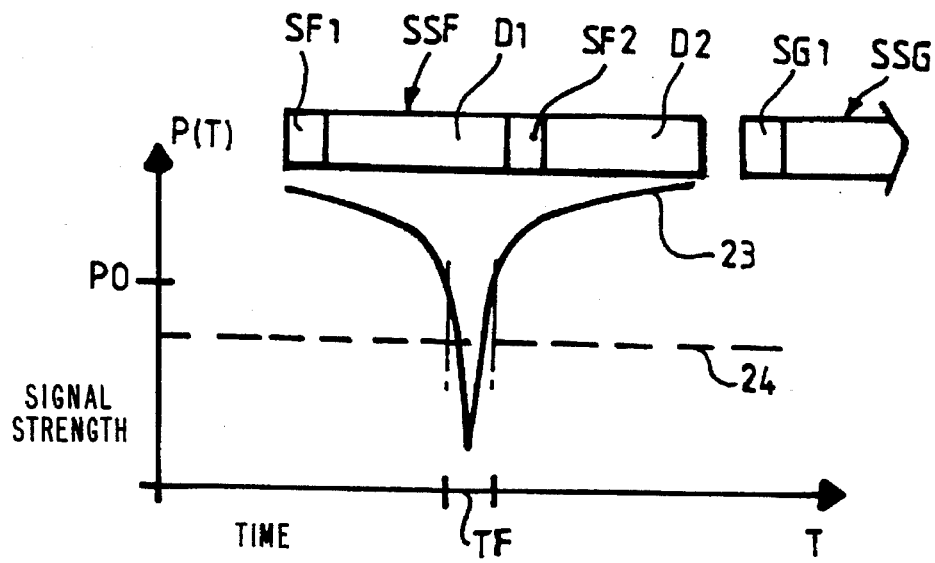
FIG. 5 is a diagram illustrating signal strengths of fading radio signals.
Figure 6:
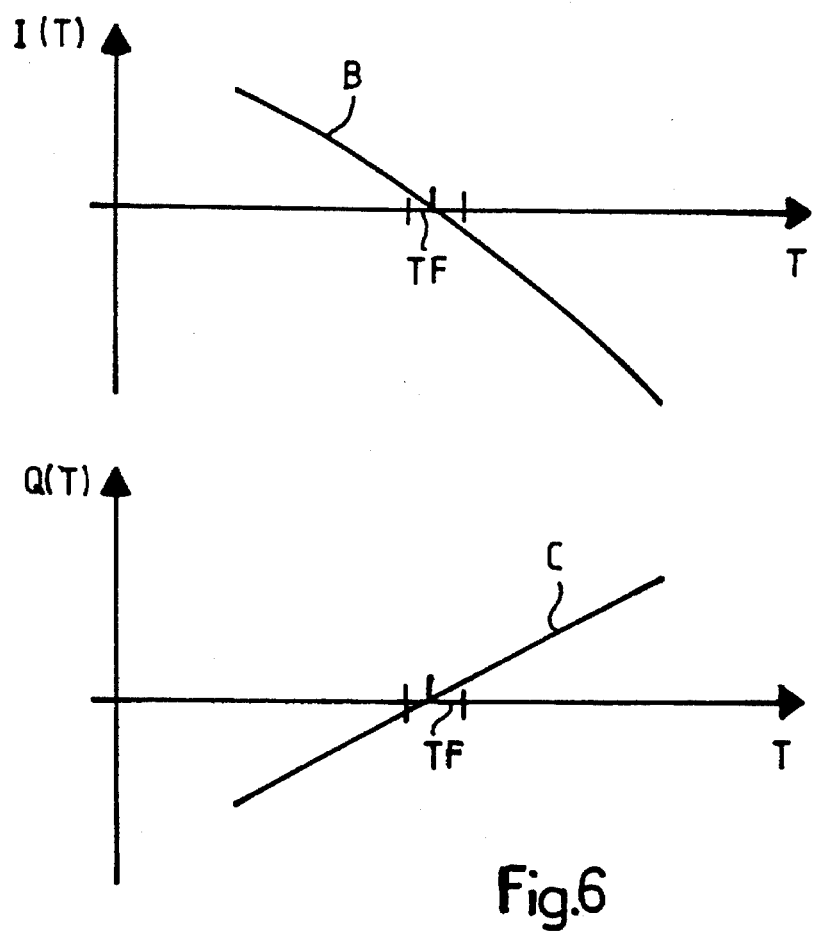
FIG. 6 is a diagram illustrating levels of the components of the complex symbols.

Included in the diagram of FIG. 5 is a curve 23 which illustrates how the strength P(T) of the signal received by the mobile 22 can vary over the time period of the signal sequence SSF. The noise level is shown by a chain line 24 and the Figure shows how the signal strength P(T) falls beneath a threshold value PO during a time interval TF, which is a centre for a fading occasion. The signal strength is calculated in accordance with a relationship $P(T)=I^2(T)+Q^2(T)$ for the aforesaid complex signal y(T). Whereas the signal strength P(T) varies quickly during fading, the components I(T) and Q(T) of the complex signal vary more evenly and relatively slowly. This is illustrated in FIG. 6 with curves B and C, which show that the time derivatives of the complex components are constant, or almost constant, even during the fading occasion TF.

The present invention takes its starting point from the regular occurrence of the time derivatives of these complex signal components. The invention will be described in the following with the aid of examples and also with reference to the aforesaid time-shared radio communication system.

FIG. 1 illustrates schematically the time-varying radio channel between the transmitter 2 and the receiver 3. Parameters for this radio channel are described in a known manner with its sampled impulse response $$\underline{h}(n)=[h_0(n),h_1(n), \text{---} ,h_m(n)]^T \quad (1)$$

where the underlining indicates a vector and index T denotes a vector transposition. The received sample signal y(n) can be described as a convolution between this impulse response for the actual radio channel and the signal d(n) according to $$y(n)=\underline{h}^H(n)\underline{d}(n)+w(n) \quad (2)$$

In this case, $$\underline{d}(n)=[d(n),d(d-1), \text{---} , d(n-m)]^T \quad (3)$$

is the synchronizing sequence or the decided data that is considered to be known. The index H signifies Hermit transposition, that is to say transposition and complex conjugation, and w(n) signifies a disturbance.

There is formulated for the time-varying channel a channel model, with whose help data is decided from the received signal y(n). According to the invention, the model includes a description of channel parameters and also time derivatives of said parameters. If only the first derivative is included, the following general relationship is obtained $$\underline{\mathbf{h}}(n)=\underline{\mathbf{h}}(n-1)+TS\underline{\dot{\mathbf{h}}}(n-1)+ v1(n)$$

$$\underline{\dot{\mathbf{h}}}(n)=\underline{\dot{\mathbf{h}}}(n-1)+v2(n) \quad (4)$$

The bold-style signifies that the magnitudes belong to the channel model which is an estimate of the actual channel. A time derivative is signified with a dot over the symbol concerned, in the usual manner, and $v1(n)$ and $v2(n)$ are magnitudes that are contingent on a selected adaptation algorithm. If an LMS-algorithm (Least Mean Square) is selected for $\underline{vs}(n)$ and $\underline{v2}(n)$, there is obtained $$\underline{\mathbf{h}}(n)=\underline{\mathbf{h}}(n-1)+TS\underline{\dot{\mathbf{h}}}(n-1)+\mu 1\underline{d}(n)e^*(n)\underline{\dot{\mathbf{h}}}(n)=\underline{\dot{\mathbf{h}}}(n-1)+\mu 2\underline{d}(n)e^*(n) \quad (5)$$

In this case, $$e(n)=y(n)-\underline{\mathbf{h}}^H(n-1)\underline{d}(n)$$

is an error signal in the adaptation. The symbol * signifies a complex conjugation and μ1 and μ2 are constants. According to one alternative, these constants may have different values for the different coefficients in h(n) and ḣ(n). It should be observed that the derivative estimate ḣ(n) is used when estimating the channel parameters h(n). The relationships (5) are given at a sampling time point n. Signal processing is delayed in the channel equalizer 5 by L number of sampling intervals and signals with this delay are shown in FIGS. 7 and 8.

Figure 7:
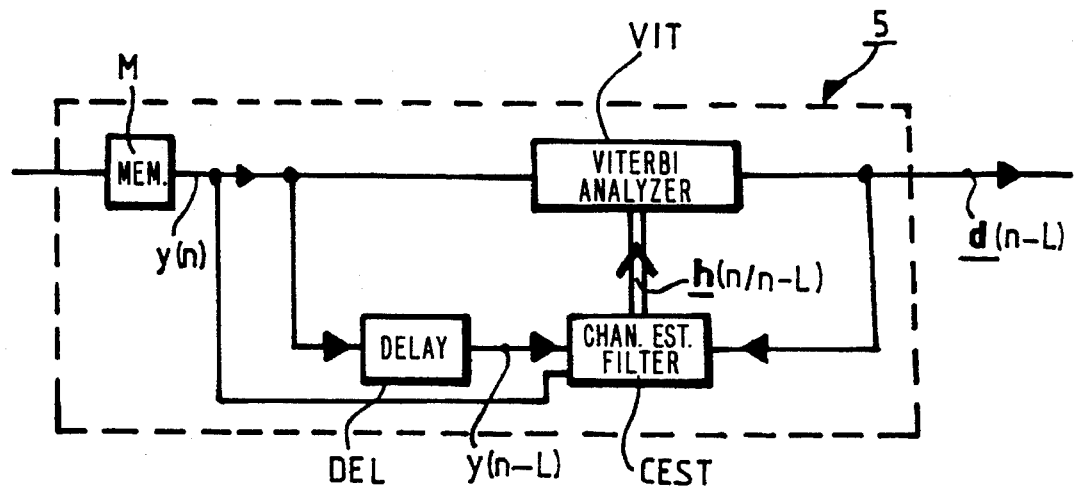
FIG. 7 is a block schematic of a channel equalizer.

The aforesaid algorithm according to the relationship (5) is used in the equalizer 5, which is shown schematically in FIG. 7. The equalizer has a Viterbi analyzer VIT, an adaptive channel estimation filter CEST, a delay circuit DEL and a first memory circuit M. The signal sequences SSF are stored successively in this memory circuit prior to effecting other processing of signals in the equalizer 5. The Viterbi analyzer VIT receives the signal y(n) from the memory M and produces the symbols d̲(n-L), which are estimated with a delay of L number of sampling steps. The channel estimation filter CEST receives the estimated symbols d̲(n-L) and the signals y(n) and y(n-L). These latter signals are the received signals y(n) delayed by L number of sampling steps in the delay circuit DEL. The channel estimation filter CEST delivers the estimated impulse response h̲(n/n-L) to the Viterbi analyzer VIT. It should be noted that in addition to the actual radio channel, the channel estimate also includes transmission filter and receiver filter. According to an alternative embodiment of the invention, preliminary decisions from the Viterbi analyzer VIT are used instead of the estimated symbols d̲(n-L). This results in a delay which is shorter than the L number of sampling intervals. Estimation of the impulse response h̲(n/n-L) will be described in more detail below with reference to FIG. 8.

Figure 8:
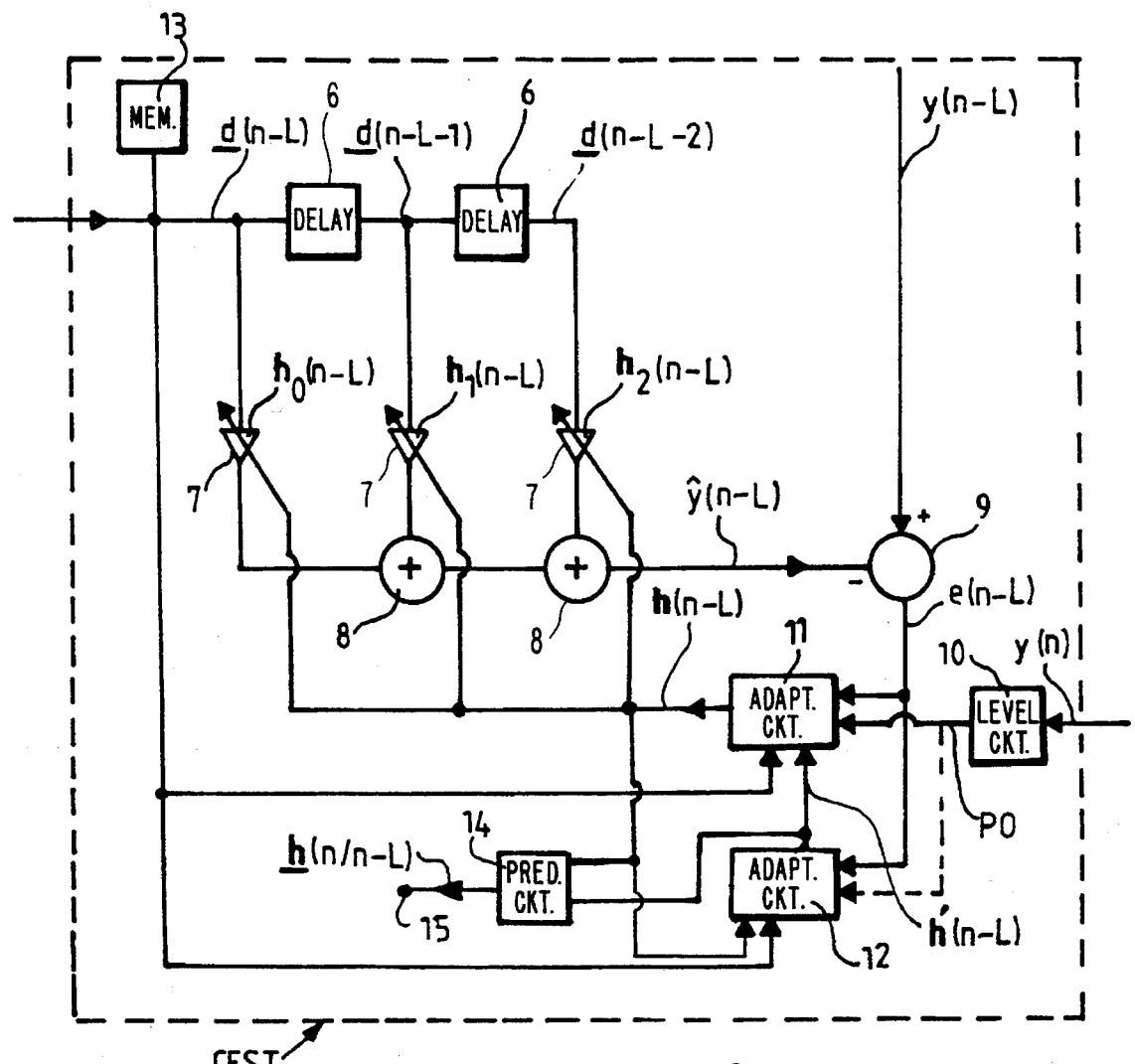
FIG. 8 is a block schematic of a channel estimation filter.

FIG. 8 is a block schematic over the channel estimation filter CEST. The filter has delay elements 6, adjustable coefficient circuits 7, summators 8, a difference former 9, a level circuit 10, two adaptation circuits 11 and 12, a second memory circuit 13 and a prediction circuit 14 having an output 15. The number of coefficient circuits 7 provided will depend on the size of the time dispersion that the radio channel can have expressed in a number of sampling intervals, and according to the illustrated example, three circuits are provided. The delay elements 6 delay the symbols d̲(n-L) stepwise by one sampling interval. The symbols d̲(n-L), d̲(n-L-1) and d̲(n-L-2) are multiplied in the coefficient circuits 7 by coefficients $h_0$(n-L), $h_1$(n-L) and $h_2$(n-L) of the channel estimate. The values obtained are summated in the summators 8 to form an estimated signal ŷ(n-L). The error signal e(n-L) is calculated in the difference former 9 and is delivered to the adaptation circuits 11 and 12. The channel estimate h̲(n-L) and the derivative estimate ḣ(n-L) are adapted in the circuits with the aid of the estimated symbols d̲(n-L). The channel estimate is also influenced by the level PO, which is a threshold value for the signal strength of the received signal y(n). The threshold value, shown in FIG. 5, is delivered from the level circuit 10. The prediction circuit 14 functions to predict the obtained channel estimate with the aid of the derivative estimation. The output 15 of the prediction circuit is connected to the Viterbi analyzer VIT.

When signals are received without fading during the time interval TF, the channel estimation circuit CEST operates in the following manner. The channel estimate h̲(n-L) and its derivative ḣ(n-L) are calculated first, with the aid of the synchronizing sequence SF1. This is effected with the aid of the synchronizing sequence d̲(n-L) stored in the memory circuit 13 and the received, observed synchronizing sequence y(n-L). In this case, there is first effected a channel correlation which gives an initial value h̲(0) for the channel estimate according to a relationship $$h_1(0) = 1/K \sum_{i=1}^{K} d(i)y^*(i+1) \quad (6)$$

The relationship is shown here for the second coefficient $h_1$(n) in the channel estimate h̲(n)=[$h_0$(n), $h_1$(n), $h_2$(n)]$^T$. K signifies the number of symbols in the synchronizing sequence SF1 used for the correlation. A zero value can be used as the initial value of the derivative. The synchronizing sequence SF1 is then used once more, by successively adapting the channel estimate and the derivative estimate with the aid of the adaption circuits 11 and 12 according to the algorithm in the relationship (5) above. The error signal e(n-L) is minimized in this procedure so that the coefficients $h_0$(n-L), $h_1$(n-L) and $h_2$(n-L) form the channel estimate. Adaptation of the channel estimate and the derivative estimate is then continued successively during the transmission of the data sequence D1, with the aid of decided data d̲(n-L) from the Viterbi algorithm VIT. The procedure is repeated for the synchronizing sequence SF2 and the data sequence D2. According to a simplified alternative, adaptation to the data sequence is performed directly after the channel correlation. The channel estimation obtained in the aforesaid manner applies to the time point (n-L). The channel estimation is predicted in the prediction circuit 14 from the time point (n-L) to the time point (n) with the aid of the derivative estimation. This results in a channel estimation intended for the Viterbi analyzer, this estimation being designated h̲(n/n-L) in the Figure. Thus, the derivative estimate ḣ(n/n-L) is not only used to calculate the channel estimate according to the relationship (5), but is also used to predict the channel estimation up to time point (n). In this way, the values of the estimated symbols d̲(n-L) obtained from the Viterbi analyzer VIT will be more certain, which in turn enables the channel estimation in the circuits 11 and 12 to be improved. A simplified alternative excludes prediction in the circuit 14. The channel estimate is delivered to the Viterbi analyzer from the output 15.

The following procedural steps are carried out in the channel estimation circuit CEST in the event of fading. The power of the received signal y(n) is calculated in the level circuit 10 and is compared with the threshold value PO. This calculation is carried out with the aid of the signal y(n) received from the first memory circuit M prior to processing the entire signal sequence SSF in the channel equalizer. This provides information as to whether fading occurs before actual estimation of the symbols d̲(n-L) takes place. If the signal strength is below the threshold value PO, that is to say fading is considered to prevail, a corresponding signal is sent to the adaptation circuit 11. In this case, the constant $\mu_1$ in the relationship (5) is given a small value or a zero value, so that the channel estimate h̲(n) is adapted substantially or completely with the aid of the derivative estimate ḣ(n). The signal strength P(T) is changed very quickly in the event of fading and is very low, see FIG. 5, and adaptation with the error signal e(n) becomes very uncertain and generates noise. On the other hand, the derivatives of the signal components I(T) and Q(T) vary much more slowly and more regularly than the signal strength P(T), as shown in FIG. 6. This causes the derivative ḣ(n) of the actual radio channel also to vary slowly and regularly. Consequently, adaptation with the aid of the derivative estimate ḣ(n) becomes reliable, even during the fading occasion TF. If the constant $\mu_1$ is set to zero during the fading occasion, channel estimation becomes a simple prediction with the aid of the derivative estimate ḣ(n). It is also possible to hold the derivative estimate constant during fading, by setting the constant $\mu_2$ to zero. This is effected by sending a signal from the level circuit 10 to the adaptation circuit 12, as indicated by a broken-line connection in FIG. 8. The constants $\mu_1$ and $\mu_2$ are set to their original values when the signal strength exceeds the threshold value P(O) at the end of the fading occasion. The threshold value PO can be set to a very low value or to a zero value in the case of a simplified method. In this case, the estimation according to the relationship (5) is also carried out during the fading occasion TF.

An initial value ḣ(O) for the derivative estimate can be obtained in the following manner. The channel estimate $\underline{h}(O)$ and $\underline{h}(R)$ for the two known synchronizing sequences $\overline{SF1}$ and $\overline{SF2}$ are calculated with the aid of the received signals y(n) stored in the first memory M. The initial value is obtained in accordance with the relationship $$\underline{\dot{h}}(O) = \{\underline{h}(R) - \underline{h}(O)\}/R \qquad (7)$$

where R is the time distance between the synchronizing sequences, calculated as the number of symbols between said sequences. In the time-shared system according to FIG. 2, a corresponding initial value can be calculated with a starting point, for instance, from SF2 and the synchronizing sequence SG1, which belongs to the bordering time slot G. The time slots and F and G lie on the same carrier frequency and the subscriber on the time slot F can be permitted to listen on the synchronizing sequence SG1 in order to be able to carry out the calculation according to the relationship (7) above. It should be observed that only the mobile can utilize this possibility with synchronizing sequences from separate time slots. It should also be observed that, for instance, SF2 need not be a true synchronizing sequence, but may be some other known sequence, as indicated above. It is also possible to utilize a fading occasion to calculate an initial value of the derivative estimation. In the event of a fading occasion, the channel estimate is set to $\underline{h}(R)=0$ and the initial value of the derivative estimate is calculated according to $$\underline{\dot{h}}(O) = -\underline{h}(O)/R$$

where $\underline{h}(O)$ is the channel estimation for one of the synchronizing sequences and R is the number of symbols between the fading occasion and said synchronizing sequence. When calculating the start values for the derivative estimate as described above, the channel estimate can be calculated in a simplified fashion, without the aid of the derivative estimate. In this case, calculation of the channel estimate for the synchronizing sequences assumes that the synchronizing sequences have not been afflicted by fading.

In the aforedescribed exemplifying embodiment of the inventive method, only the first time derivative of the channel estimate has been included. It lies within the scope of the invention, however, to use derivatives of higher orders. For instance, the relationship (5) can be expanded with an equation for calculating the second derivative of the channel estimation, and this is included in the expressions for the channel estimate and its first derivative.

It is assumed that the modulation shown in FIG. 3 is a signal modulation in which the symbol vectors are given in relation to a fixed reference axis. Alternatively, differential modulation can be applied, in which the phase position of a symbol is instead given in relation to the phase position of a preceding symbol. The invention can be used for signals modulated in this way. The phase position of the receiver is given a value, for instance a zero value, at the start of the first synchronizing word SF1. This enables a well-defined starting value $\underline{h}(O)$ to be calculated for the channel estimation. The start phase for the second synchronizing word SF2 will depend on the phase positions of the symbols in the data sequence D1. These phase positions are unknown and the starting phase for SF2 is therewith indefinite. If differential QPSK-modulation is used, four possible values for the starting phase in SF2 are found and therewith also four possible initial values for the derivative estimate $\underline{\dot{h}}(O)$, which is calculated according to the relationship (7) above. The most likely of these initial values is selected, by demodulating the data sequence D1 with a starting point from all four of the initial values and selecting the demodulation which gives the least error signal. In the exemplified case using a Viterbi equalizer, the error signal is equal to the metric value calculated in accordance with the Viterbi algorithm. In order to determine the least error signal and the initial value, it is sufficient to demodulate solely a part of the data sequence D1 or to only use the synchronizing sequence SF1 as a training signal and train four times on this sequence.

Although the inventive method has been described in the aforegoing with reference to a Viterbi equalizer 5, it will be understood that the method can also be used for other types of equalizer, for instance DFE-utilizer (Decision Feedback Equalizer). The method can be applied to advantage immediately the radio channel has a rapidly varying transmission function and not solely in the event of fading.

We claim:

1. In a radio receiver, a method of adapting a channel estimate for a time-varying radio channel in which radio signals are transmitted over the radio channel between a transmitter and the receiver and are subjected to disturbances such as multipath propagation, fading and noise, and in which received radio signals are sampled to obtain received symbol sequences which include information-carrying symbols and at least one known symbol sequence such as a synchronizing sequence, said method comprising the steps of:

forming a first channel estimate by estimating parameters of a transmission function of the radio channel based on the synchronizing sequence in a received symbol sequence, forming a first derivative estimate by estimating at least a first time derivative of the first channel estimate, measuring a signal strength of the received radio signals;

setting an initial value of the first derivative estimate;

adapting the first derivative estimate based on a subsequent received symbol sequence; and adapting the first channel estimate based on the first derivative estimate when the measured signal strength is less than a threshold value.

2. A method according to claim 1, in which the known symbol sequence reoccurs at desired time intervals and received symbol sequences are stored in a memory provided in the receiver, wherein the initial value of the first derivative estimate is set by the steps of:

forming a second channel estimate based on another of the known symbol sequences;

determining a time distance between the first channel estimate and the second channel estimate;

forming a difference between the first channel estimate and the second channel estimate; and forming a quotient between said difference and the time distance, said quotient constituting the initial value assigned to the first derivative estimate.

3. A method according to claim 1, in which received symbol sequences are stored in a memory in the receiver, wherein the initial value of the first derivative estimate is set by the steps of:

establishing a fading time point having a disappearing signal strength;

assigning zero values to the parameters of the transmission function for the fading time point;

forming the first channel estimate based on the synchronizing sequence;

determining a time distance between the synchronizng sequence and the fading time point; and forming a quotient between sad first channel estimate and the time distance, sad quotient constituting the initial value set for the first derivative estimate.

4. In a radio receiver, a method for determining a channel estimate for a time-varying radio channel in which radio signals are transmitted over the radio channel between a transmitter and the receiver and are subjected to disturbances, such as multipath propagation, fading and noise, and in which received radio signals are sampled to obtain received symbol sequences which include information-carrying symbols and at least one known symbol sequence such as a synchronizing sequence, said method comprising the steps of:

storing received symbol sequences in a receiver memory;

determining the channel estimate by estimating parameters of a transmission function of the radio channel based on the synchronizing sequence in a first received symbol sequence;

determining the channel estimate by estimating the parameters of the transmission function of the radio channel based on a second received symbol sequence that is time-separated from the first received symbol sequence;

determining a time distance between the two channel estimates;

forming a difference between the two channel estimates;

obtaining a quotient between said difference and the time distance, said quotient constituting an initial value of a first time derivative of the channel estimate;

forming a derivative estimate by estimating parameters of at least the first time derivative of the channel estimate based on the initial value and one of the received symbol sequences; and determining the channel estimate based on a subsequent received symbol sequence and the derivative estimate.

5. A method according to claim 4, further comprising the steps of:

measuring a signal strength of the received radio signals; and determining the channel estimate based on the subsequent received symbol and the derivative estimate when the measured signal strength is less than a threshold value.

6. A method according to claim 4, wherein the channel estimate based on the second received symbol sequence is determined based on one of the known symbol sequences in the second received symbol sequence.

7. A method according to claim 5, further comprising the steps of:

establishing a fading time point of a fading occasion having a disappearing signal strength; and determining the channel estimate based on the second received symbol by assigning a zero value to the parameters of the transmission function for the established fading time point.

8. A method according to claim 2, in which the radio transmission is time-shared with at least two separate time slots for separate receivers on a common carrier frequency, wherein of the two known symbol sequences, one is the synchronizing sequence for a first time slot and the other is a synchronizing sequence for a second time slot.

9. A method according to claim 1, wherein when the signal strength lies above said threshold value, the derivative estimate is adapted using the subsequent received symbol sequence and the channel estimate is adapted using both the derivative estimate and the subsequent received symbol sequence.

10. A method according to claim 1, in which subsequently received radio signals are processed in an analyzer to estimate time-delayed received symbols sequences, wherein said channel estimate, at a delayed time point, is predicted forward in time a selected number of sampling time points based on the derivative estimate to form a second channel estimate intended for the analyzer.

11. A method according to claim 2, in which the received symbol sequences are modulated differentially to produce at least two separate phase positions which are given in relation to the phase positions of preceding symbols, and further comprising the steps of:

setting a symbol in one of the known symbol sequences to a desired one of the different phase positions;

subsequently setting a symbol in another of the known symbol sequences to each of the separate phase positions;

demodulating at least a part of the transmitted radio signal with a starting point from the set phase positions in the two known symbol sequences;

selecting that phase position for the other of the known symbol sequences which when effecting said demodulation produces a smallest error signal; and demodulating the transmitted radio signal based on the selected phase position.

12. A method according to claim 6, in which the radio transmission is time-shared with at least two separate time slots for separate receivers on a common carrier frequency, wherein of the two known symbol sequences, one is the synchronizing sequence for a first time slot and the other is a synchronizing sequence for a second time slot.

13. A method according to claim 5, wherein when the signal strength lies above said threshold value, the derivative estimate is adapted using the subsequent received symbol sequence and the channel estimate is adapted using both the derivative estimate and the subsequent received symbol sequence.

14. A method according to claim 4, in which subsequently received radio signals are processed in an analyzer to estimate time-delayed received symbols, wherein said channel estimate at a delayed time point is predicted forward in time a selected number of sampling time points based on the derivative estimate to form a second channel estimate intended for the analyzer.

15. A method according to claim 4, in which the symbols are modulated differentially to produce at least two separate phase positions which are given in relation to the phase positions of preceding symbols, further comprising the steps of:

setting a symbol in one of the known symbol sequences to a desired one of the different phase positions;

subsequently setting a symbol in the other of the known symbol sequences to each of the separate phase positions;

demodulating at least a part of the transmitted radio signal with a starting point from the set phase positions in the two known symbol sequences;

selecting that phase position for the other of the known symbol sequences which when effecting said demodulation produces a smallest error signal; and demodulating the transmitted radio signal with the aid of the selected phase position.

\* \* \* \* \*